Oct. 8, 1946.  F. A. FRITZSCH  2,408,841
MACHINE TOOL STRUCTURE
Filed Sept. 28, 1943  11 Sheets-Sheet 1

INVENTOR
FRANK A. FRITZSCH
BY
Zugelter, Kinney and Zugelter
ATTORNEYS

Oct. 8, 1946.  F. A. FRITZSCH  2,408,841
MACHINE TOOL STRUCTURE
Filed Sept. 28, 1943  11 Sheets-Sheet 3

INVENTOR
FRANK A. FRITZSCH
BY
Zugelter, Kinney & Zugelter
ATTORNEYS

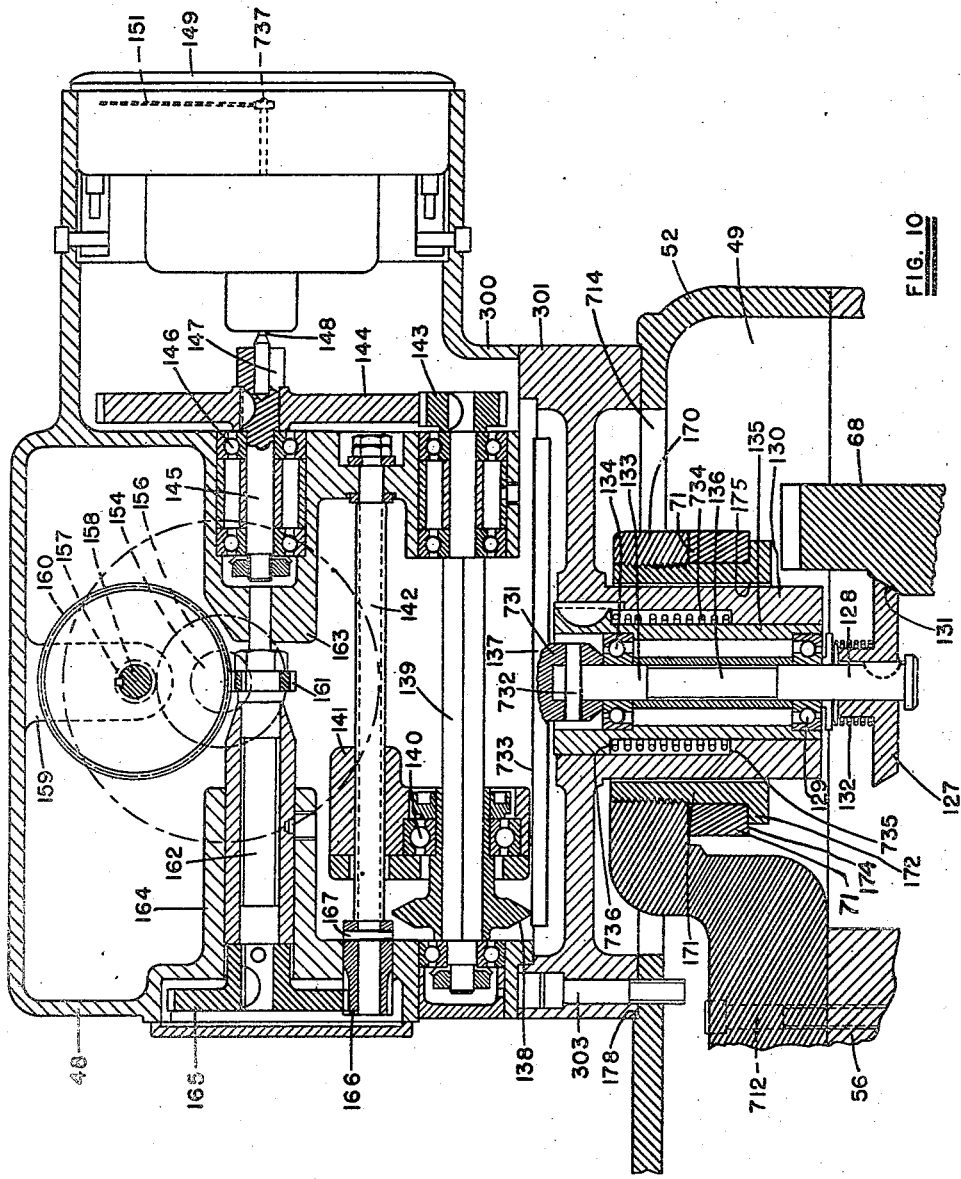

Oct. 8, 1946.　　　　F. A. FRITZSCH　　　　2,408,841
MACHINE TOOL STRUCTURE
Filed Sept. 28, 1943　　　11 Sheets-Sheet 11
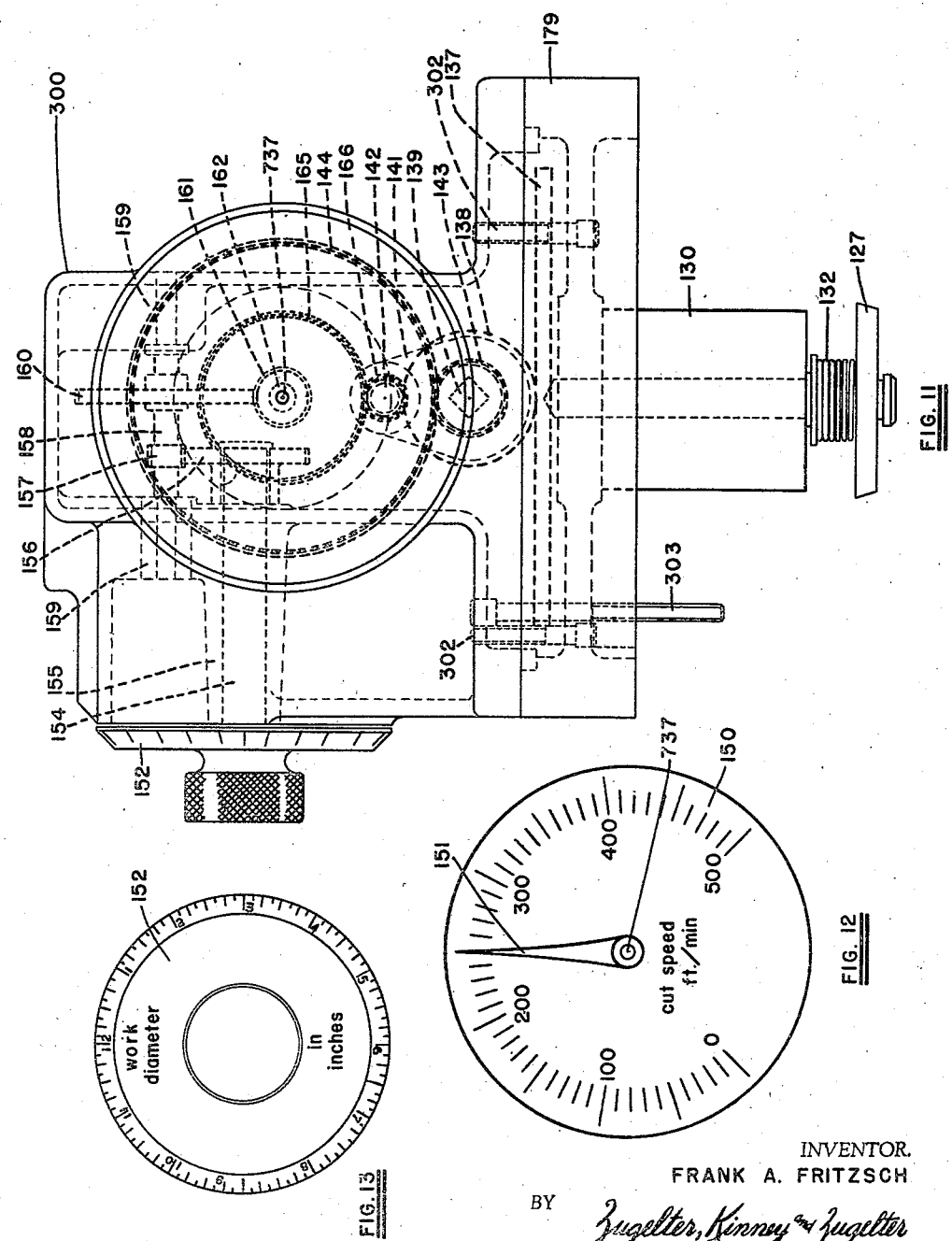
INVENTOR.
FRANK A. FRITZSCH
BY
Zugelter, Kinney & Zugelter
ATTORNEYS Patented Oct. 8, 1946

2,408,841

UNITED STATES PATENT OFFICE 2,408,841

MACHINE TOOL STRUCTURE

Frank A. Fritzsch, Cincinnati, Ohio, assignor to The Lodge & Shipley Machine Tool Company, Cincinnati, Ohio, a corporation of Ohio Application September 28, 1943, Serial No. 504,134

13 Claims. (Cl. 82—29)

This invention relates to machine tools of the general class comprising a power driven spindle, and of which class of devices lathes are typical.

The invention will be explained herein, as applied to a lathe, however, it is to be understood that such language as is applied by reason of its applicability to the lathe category of machine tools, is resorted to for the purpose of explanation and not for the purpose of limitation.

In machine tools of the general class to which this invention is particularly applicable, it is desirable to apply rotative force or power to the live or driven spindle, at a location as close as possible to the forward or work engaging end of the spindle, commensurate with the provision of suitable and customary back gearing between the work engaging end of the spindle and the place at which driving power is applied to the spindle. This is so because of various factors bearing upon the perfection or degree of accuracy of the work that can be done on such machines. Because of the desirability of the stated relationship of those parts of the machine there occur certain problems relating to maintenance, service and repair that will be more fully explained hereafter, and which can be accomplished in a device embodying the instant invention, without disturbing the mounting of spindle bearings or of the spindle in such bearings. This is very important. In that regard it should be observed that in the initial building of such a machine, the manufacturer must resort to special practices in the fabrication and assembly of such machines in order to assure that exact mounting and relating of various parts of the spindle assembly to the machine tool body or head, essential for attaining the high degree or standard of accuracy and efficiency demanded from such machines in production operations.

One of the objects of the invention is to provide such an arrangement of parts and such an assembly thereof, that the ordinary and expected adjustments required between various parts or mechanisms provided for imparting rotative power to the live spindle, can be readily effected without any disturbance of the initial adjustments made by the manufacturer of the machine, for properly assembling the live spindle in the machine tool body or headstock.

Another object of the invention is to provide a machine tool of the class described, wherein may be incorporated an infinitely variable speed headstock or live spindle.

Another object of the invention is to provide a machine tool of the class described, wherein may be incorporated a high speed direct drive between the spindle and drive pulley for transmitting open belt speeds directly to the spindle.

Another object of the invention is to provide a machine tool of the class described, which includes a pair of synchronized, dual controls, one located on the headstock and the other located on the apron, by which the operating characteristics of the prime mover may be accurately regulated over an infinitely variable speed range for controlling the speed of rotation of the spindle.

A further object of the invention is to provide a machine tool embodying the hereinabove described characteristics and wherein the spindle may be selectively driven directly from the drive pulley or through back gearing interposed between said spindle and drive pulley.

Another object of the invention is to provide a machine tool of the class described wherein an endless belt drive may be provided for transmitting power from a prime mover to the spindle pulley, and which endless belt drive may be renewed without disturbing, or in any way affecting the alignment or mounting of the live spindle.

Another object of the invention is to provide a machine tool of the class described wherein the prime mover is slidably mounted relative to the spindle drive pulley for facilitating ease of renewal of the endless belts comprising the belt drive.

Another object of the invention is to provide in a machine tool of the class described, spindle indexing means by which the feed drive may be positively locked against accidental and/or unintentional rotation or movement relative to the spindle incident to disengagement of the feed drive from the spindle for indexing purposes.

Another object of the invention is to provide a machine tool having the hereinabove described characteristics, and which includes a translatable auxiliary or supplemental spindle from which the feed drive transmission and headstock lubrication pump is driven.

Another object is to provide a machine tool embodying the indicated features and with which may be cooperatively related, improved spindle indexing means, for attaining therefrom, the various benefits and advantages incident to the use of indexing means as exemplified in prior art devices of the same or analogous class of machine tools.

Another object of the invention is to provide a machine tool embodying the hereinabove enumerated characteristics, and with which may be cooperatively related a continuously operating cut-speed indicator on which the peripheral speed of work being rotated by the spindle will be visible from stations at and remote from the headstock.

Another object is to provide means whereby there may also be attained with a machine embodying the previously related features, the additional benefits incident to control of the live spindle from variable stations remote from the headstock or live spindle.

These and other objects are attained by the means described herein and as disclosed in the accompanying drawings, in which:

Fig. 10 is a vertical sectional view of the cut-speed indicator of Fig. 1 mounted on the headstock and in driven relationship with the spindle gear 68.

Fig. 11 is a front view of the cut-speed indicator of Fig. 10, but with the dial and pointer removed for clarity of detail and understanding.

Fig. 12 is a front elevational view of the cut-speed dial and pointer of the cut-speed indicator of Fig. 11.

Fig. 13 is a front elevational view of the work-diameter dial of the cut-speed indicator of Fig. 11.

Fig. 14 is a vertical sectional view taken on line 14—14 of Fig. 4, showing a detail of the invention.

Fig. 15 is a vertical section taken on line 15—15 of Fig. 8.

Fig. 16 is a vertical sectional view taken on line 16—16 of Fig. 4.

Fig. 17 is a fragmentary perspective view of a gear 109, as shown on Fig. 14, illustrating a detail of design for the gear teeth.

Figure 1:
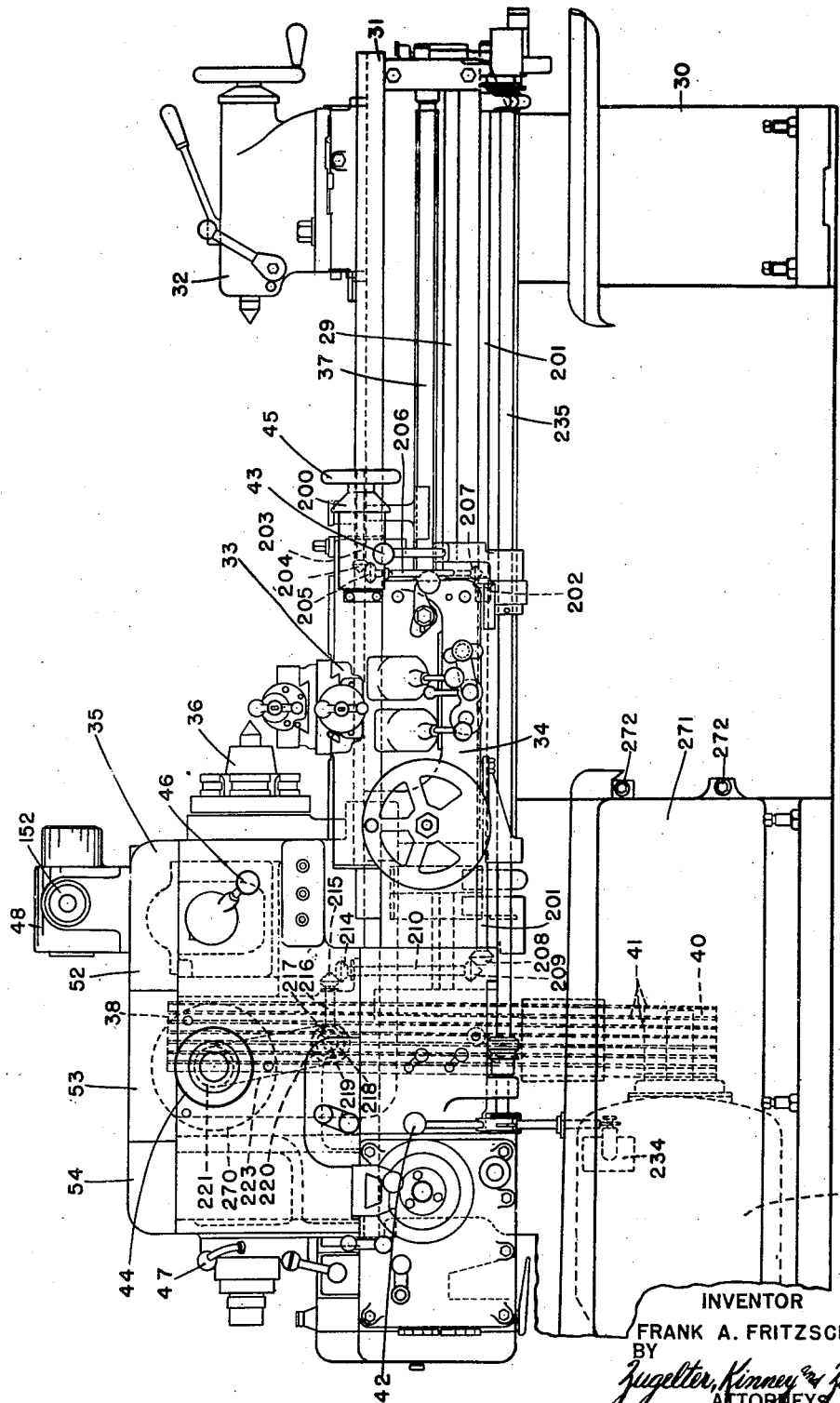
Fig. 1 is a front elevation of an engine lathe embodying my invention.

The various features of the present invention have been embodied in the engine lathe disclosed in Fig. 1, which comprises, generally speaking, a base or pedestal portion 30, a bed 31, a tailstock 32, a carriage 33, an apron 34, a headstock 35, a spindle 36, a feed rod 29, a lead screw 37, a spindle pulley 38, a prime mover 39 including a drive pulley 40, endless drive belts 41 by which power is transmitted from drive pulley 40 to spindle pulley 38, control levers 42 and 43 for starting and stopping the prime mover, a pair of synchronized hand wheels 44 and 45 for accurately controlling over an infinitely variable speed range the operating characteristics of prime mover 39, back gearing control lever 46, indexing lever 47, and cut-speed indicator 48.

As previously stated, power is applied to the spindle at a location as close as possible to its forward, nose or work engaging end commensurate with the provision of back gearing therefor, thereby effectively reducing the likelihood of distortion of the spindle by the torsional stresses induced therein incident to use thereof. As best disclosed in Figs. 5 and 6, the headstock is preferably subdivided into three separate and distinct compartments, a forward compartment 49 in which the back gearing is housed, a central compartment 50 in which spindle pulley 38 is mounted, and a rear compartment 51 in which the spindle indexing and feed drive transmission is housed. Access may be had to the interior of these various compartments by means of removable covers 52, 53, and 54 respectively (Figs. 1, 2, and 7) which may be secured in place by means of bolts 55.

Forward compartment 49 is separated from the central compartment 50 by means of a common wall 56 which forms the rear wall of the forward compartment and the forward wall of the central compartment. The rear wall 57 of the central compartment is formed integrally with bottom wall 570 which may be integral with and comprise an outboard overhanging support member projecting rearwardly from wall 56. It will be observed that rear wall 57 of the central compartment is separate and physically spaced from forward wall 58 of the rear compartment by a dimension sufficient to permit the free passage of drive belts 41 therebetween, incident to removal and/or replacement of such belts onto spindle pulley 38. It will be understood that the various walls of the headstock may be cast and that they will be suitably reinforced by means of ribbed projections, whereby to provide a rugged, heavy duty housing.

Spindle 36 (Figs. 5 and 6) comprises two separate, coaxial, rotatable elements 59 and 60 disposed lengthwise of their common axis or in axial alignment with one another. The spindle sections 59 and 60 are disposed end to end so that when coupled together they extend in non-overlapping continuity whereby each of those sections may be journaled in substantial bearings all of which are carried by and rigidly supported by the head stock and neither of the spindle sections serves as a bearing support for the other of said sections, yet permitting relative endwise movement and coupling of said sections without disturbing the initial precision mountings of said sections in and on their respective bearings or journal supports. Element 59 comprises a forward, main, or work engaging spindle housed within and extending through the forward and central compartments 49 and 50, whereas element 60 comprises a rear, supplemental or auxiliary feed drive spindle, which is housed within and extends through rear compartment 51.

Power from drive pulley 40 is transmitted through belts 41 to spindle pulley 38 which is carried by and secured to sleeve 61 by means of a key 62. Sleeve 61 is journaled in anti-friction bearings 63 in the front wall 56 and bearings 64 in bearing block 79 of rear wall 57 of the central compartment, whereby to provide a mounting which is entirely separate from and independent of main spindle 59. It will be observed that such construction effectively eliminates the transmission of belt pull from the pulley to the spindle.

A sleeve gear 65 is carried by and slideably engages the forwardly projecting splined end 66 of sleeve 61. This sleeve gear is adapted to assume one of three normal positions, viz., in mesh with internal gear 67 which is secured to and carried by spindle drive gear 68, in mesh with drive gear 69 of the back-gear transmission, or in a neutral position out of engagement with gears 67 and 69. Drive gear 69 is fixedly secured to splined shaft 74 whereas back gears 72 and 73 are axially slideable thereon. Shaft 74 may be journaled in anti-friction bearings 75 and 76 (Figs. 5 and 6) to the front and rear walls of the forward compartment 49. Drive gear 68 is keyed to spindle 59 and includes a high speed gear 77 and a low speed gear 78 which may be suitably secured thereto or may be formed integrally therewith. The high speed gear 77 is engageable with back gear 72, whereas the low speed gear 78 is engageable with back gear 73 for effecting a driving connection and various drive ratios between pulley 38 and spindle 59.

When sleeve gear 65 engages internal gear 67 of spindle drive gear 68, the spindle will be directly connected to drive pulley 38 for effecting a high speed open belt drive directly to the spindle, and the spindle speeds will be controlled by varying the operating characteristics of prime mover 39. When the sleeve gear engages gear 69, the spindle will be interconnected to the spindle pulley through the back gearing, and the spindle speeds will be controlled by manipulating control knob 46 for effecting different drive ratios therebetween.

Sleeve gear 65 may be shifted axially on splined portion 66 of sleeve 61 by means of sleeve gear shifter lever 70 and shoe 370 (Fig. 3) which engages the sleeve gear for moving it to a neutral position, or to engage one or the other of gears 67 or 69.

Figure 2:
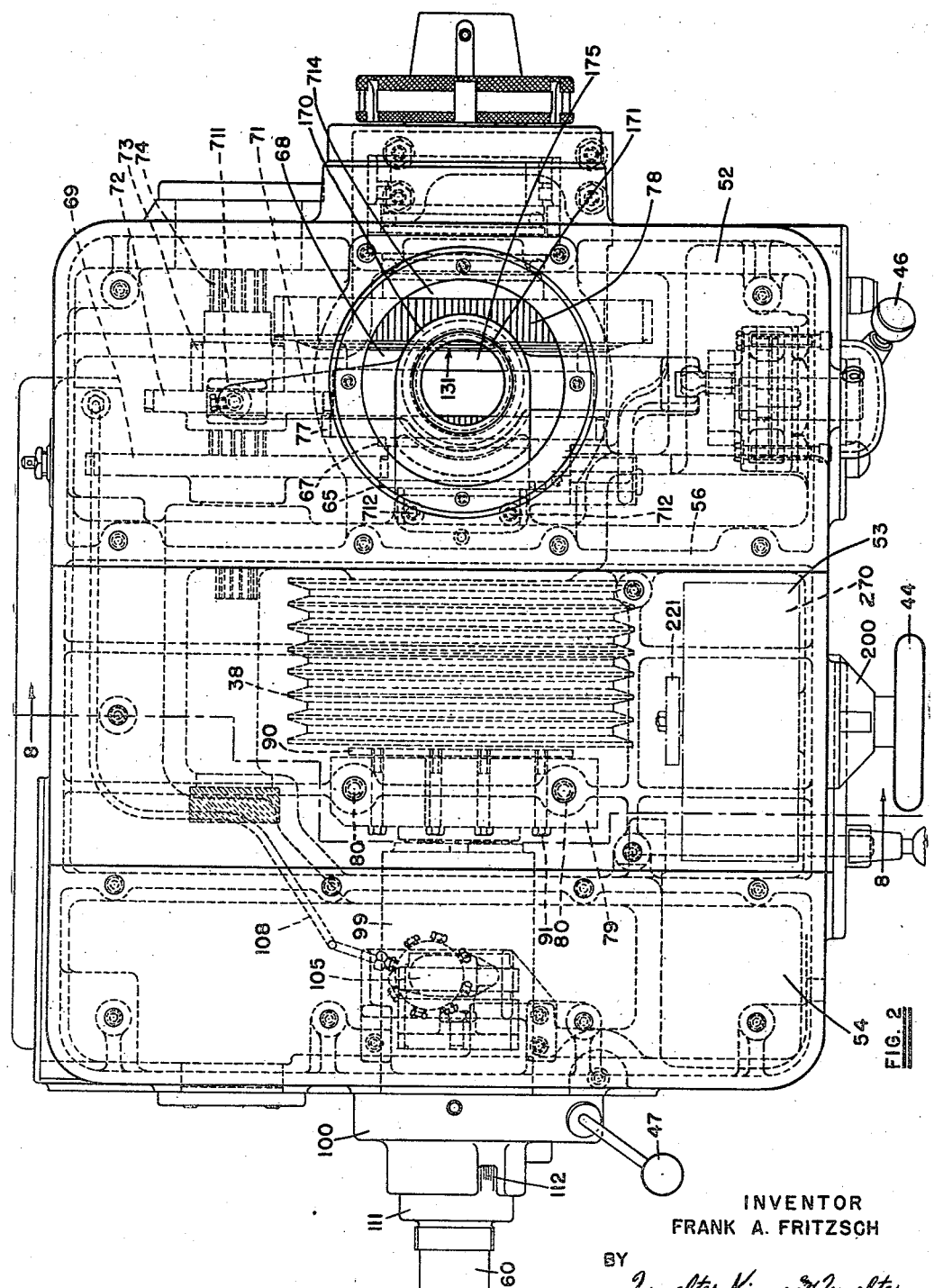
Fig. 2 is a top elevation of the headstock of Fig. 1, but with the cut-speed indicator 48 removed, for clarity of detail and understanding.
Figure 3:
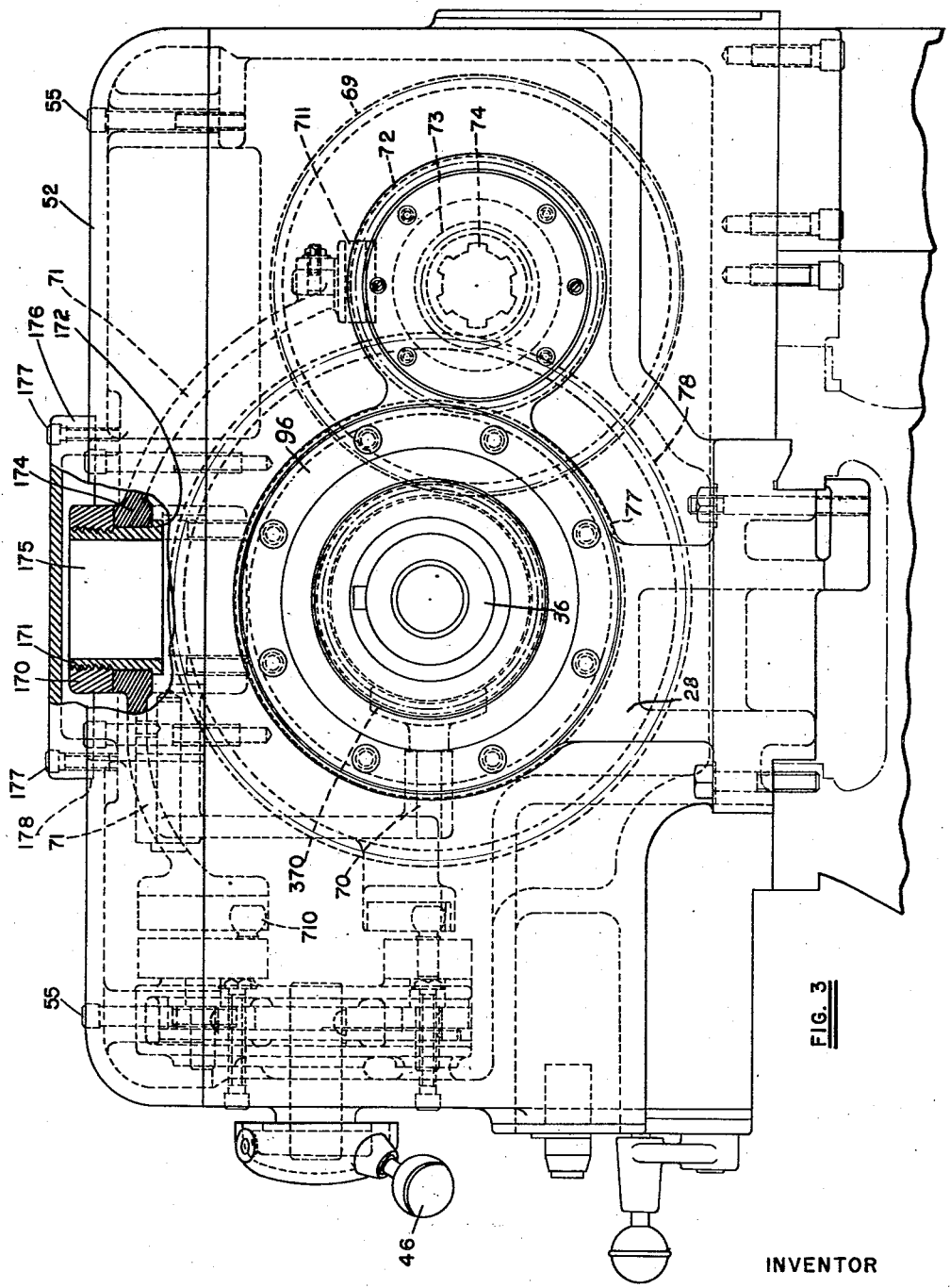
Fig. 3 is a head end elevation of the headstock of Fig. 2.

Back gears 72 and 73 may be shifted axially of shaft 74 by means of the back gear shifter lever 71 (Figs. 2, 3 and 10). Each of levers 70 and 71 may be manually actuated from and by means of the control knob or lever 46 which is mounted on and projects through the headstock housing. It is to be understood that suitable provision will be made in order to preclude more than one set of gears being engaged at one time.

The present invention is not concerned with nor directed to any particular type of back gear transmission, but may, by way of example, be similar to the transmission shown in the speed changing mechanism disclosed in my U. S. Patent No. 2,149,013 dated February 28, 1939. It will be understood that suitable indicia, not illustrated, may be provided in conjunction with the back gearing control lever 46 for enabling an operator to quickly and expeditiously select the desired driving connection between pulley 38 and the spindle, be it a direct drive or through the back gearing.

With particular reference now to Fig. 3, it will be observed that the back gear shifter lever 71 is arcuate in form, and as disclosed in Figs. 2, 3 and 10, is pivotally mounted from bracket 170. One end of said lever engages pin 710 of control knob 46, whereas the other end terminates in shoe 711 which engages gears 72 and 73 for shifting them along shaft 74. Bracket 170 is carried by wall 56, being secured thereto by means of bolts 712 (Fig. 2). Said bracket includes an annular opening threaded to engage a bushing 171 (Fig. 3) which includes an out turned lip 172. Lever 71 is provided with an annular collar 174 which circumscribes and is supported by bushing 171 and which in turn is provided with an annular opening 175 in open communication with inclined face 131 of spindle gear 68, for facilitating mounting of the cut-speed indicator in driven relationship with said spindle gear, as hereinafter more fully explained. Access to bushing 171 may be had through an aperture 714 provided in cover 52. When the cut-speed indicator is not used a cover plate 176 may be secured over aperture 714 by means of bolts 177 (Fig. 3). If desired aperture 714 may be recessed or countersunk as at 178 for providing an annular seat in which the cover plate, or cut-speed indicator base 179 (Fig. 10) may be centered.

As previously stated, the forward or main spindle 59 is adapted to be permanently mounted within and be accurately aligned relative to the headstock whereby disalignment of the spindle is effectively precluded. It is contemplated that should any adjustment or realignment of the spindle become necessary, such work would be done by, or under the direction of the manufacturer of the machine. The following sequence of steps may be advantageously followed in assembling and mounting the spindle. For convenience, a removable bearing block 79 (Figs. 2, 5, 6 and 8) may be provided for housing the bearings in which the rear ends of main spindle 59 and sleeve 61 are mounted. The bearing block may be rigidly attached to the overhanging rear wall 57 of the central compartment by means of bolts 80. This block is preferably bolted in place and bored with and as an integral part of the headstock for the purpose of insuring proper axial alignment therewith. After thus being bored the bearing block may be removed from the headstock in order that outer spindle bearing 81 (Figs. 5 and 6), separator plate 82 and outer ring 83 of the raceway of roller bearing 64 may be mounted therein. The bearing block may then be reassembled in the headstock.

Figure 5:
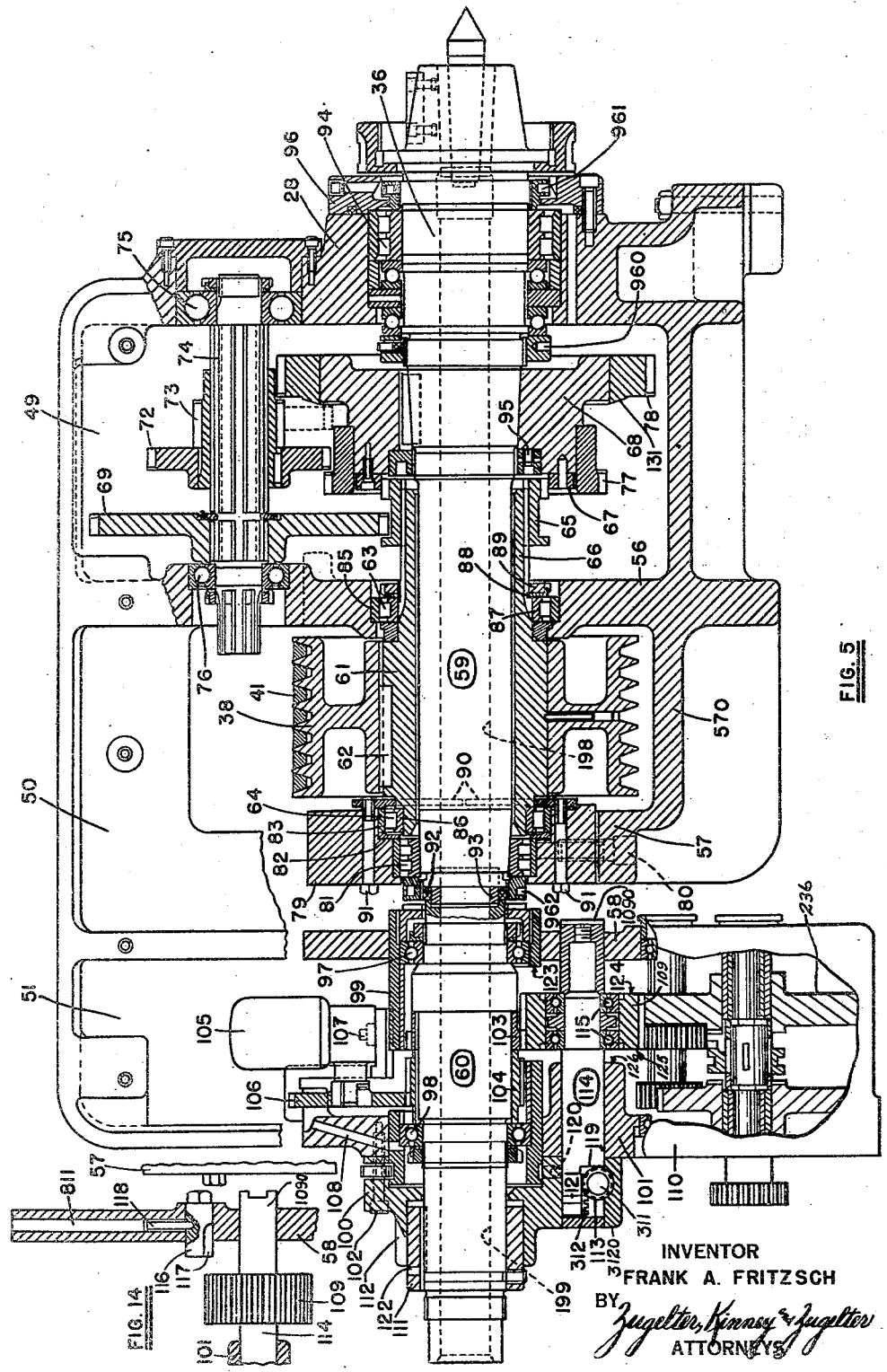
Fig. 5 is a sectional developed plan view of the headstock of Fig. 2.
Figure 6:
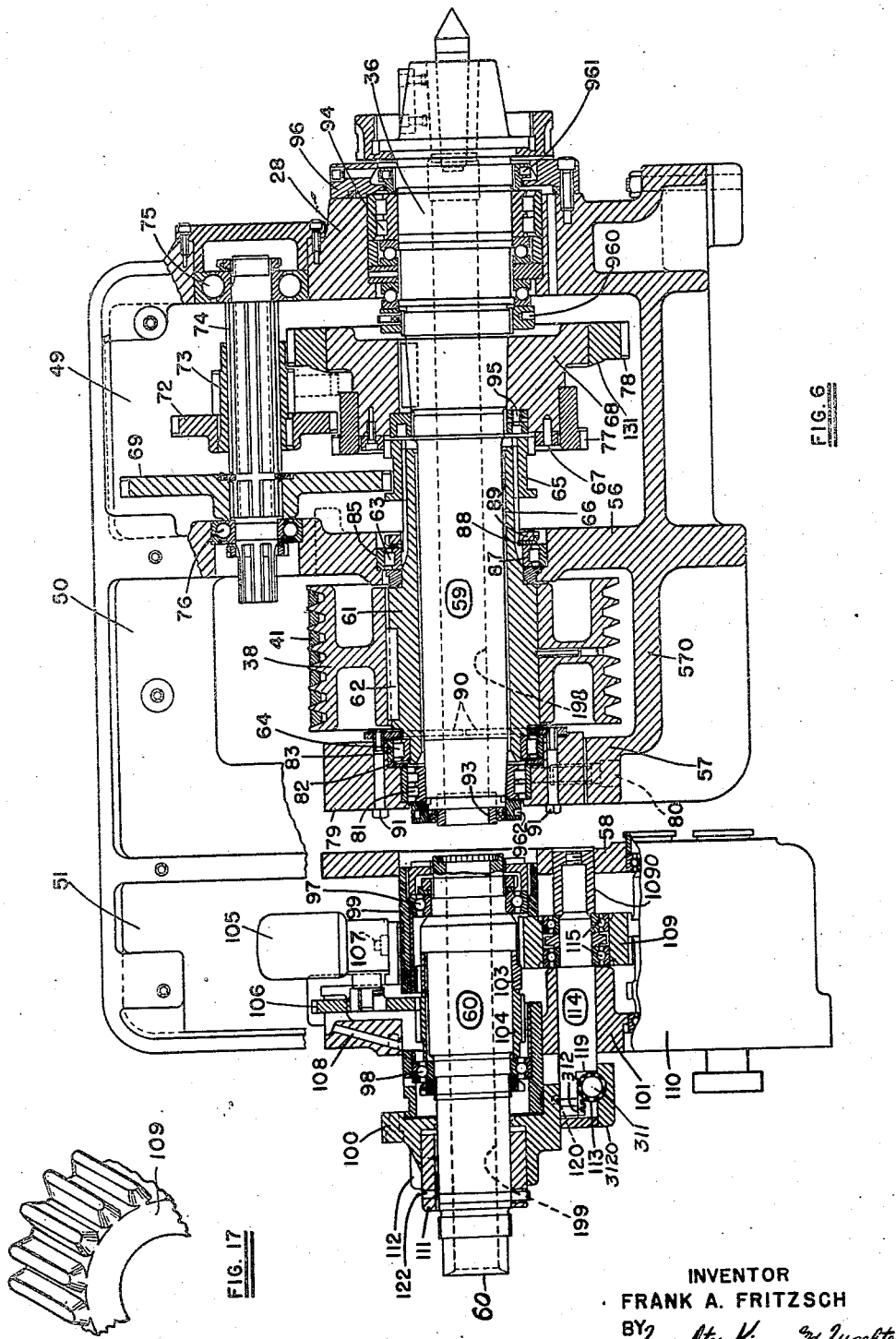
Fig. 6 is a view similar to Fig. 5, with parts thereof positioned to facilitate access to spindle pulley 38 for renewing belts thereon.

It will be observed, especially from Figs. 5 and 6, that the various compartment walls 28, 56, 57, 58 and 101 are integral, wherefore by bolting the bearing block 79 upon wall 57 in accordance with the preceding explanation, there is provided an integral, rigid and unitary headstock structure which serves as a mounting for all of the multiple bearings supporting the unitary spindle comprising the front or main spindle section 59 and the rear or supplemental spindle section 60. It is intended that those bearings shall not be disturbed after the machine is shipped to the purchaser. All assembly and adjustment in that regard is accomplished by the manufacturer, whereby the initial exceptional exactitude and accuracy of performance of the machine is maintained, notwithstanding the fact that the sections of the spindle may be separated for adjustment or renewal of driving belts or means operative for power transmission to the pulley mounted on the main spindle.

Outer race 85 of the forward bearing 63 of sleeve 61 may be located in wall 56, and said race may be locked against endwise shifting by any suitable means.

The rear end of sleeve 61 may be provided with bearings 64 and their roller carriers 86, and the forward end with bearings 63 and their roller carriers 87 which may be locked in place by means of lock washer 88 and nut 89, as shown. Sleeve 61 may now be inserted through the front of the headstock, being threaded through pulley 38 as the sleeve is threaded into its respective bearing races. The sleeve assembly, including pulley 38 may be locked in position by means of split retainer plates 90 which are held in place and engaged by bolts 91 previously loaded into their respective holes in bearing block 79 before the bearing block was bolted in place.

After the sleeve assembly has thus been positioned within the central compartment (Figs. 5 and 6), the back gear transmission comprising drive gear 69, gears 72 and 73, and shaft 74 may be mounted in the forward compartment, and sleeve gear 65 may be slipped onto the forwardly projecting splined portion 66 of sleeve 61.

The rear end of main spindle 59 is provided with clutch teeth 92 and a counterbored portion into which a liner sleeve 93 is pressed. The forward end of the spindle may be provided with the bearing assembly denoted generally by the numeral 94, after which the spindle may be inserted into the front of the headstock and threaded onto spindle drive gear 68 which may then be locked in place by means of a split nut 95 which firmly fixes this gear to the spindle. After the front spindle bearing assembly has been assembled, cover 96 may be bolted to front wall 28 of the forward compartment for clamping the outer raceways into position. The spindle may be adjusted in its bearings by means of adjustment nut 960 and then be permanently locked in adjusted position by means of nut 961. The rear or tail end bearings of the spindle may then be adjusted by means of nut 962.

Figure 8:
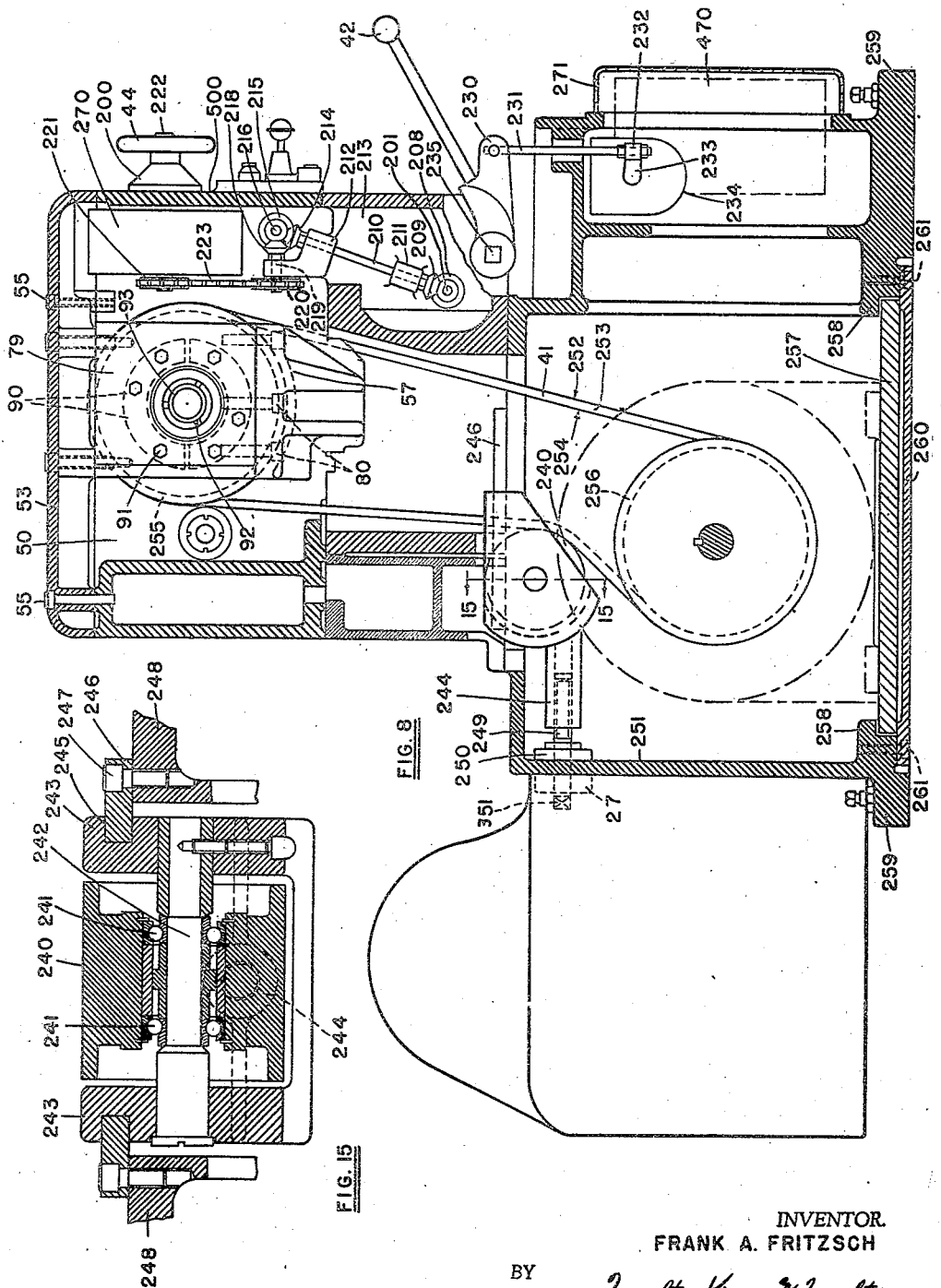
Fig. 8 is a vertical section taken upon line 8—8 of Fig. 2, but with the spindles separated as in Fig. 6.

It will be observed (Figs. 5, 6 and 8) that the overhanging rear wall 57 of the central compartment provides a rugged bearing support for the rear ends of the main spindle and sleeve 61. Such construction provides free unobstructed access to the top of the sleeve pulley for the drive belts (Fig. 8). At this point it should be understood that the present device contemplates the use of a plurality of continuous drive belts. Preferably such belts are of the so-called V-type, however, if desired, continuous canvas or glued leather belts could be substituted therefor with due consideration to the load required to be transmitted by said belts.

By using continuous drive belts, a smooth rotative force may be transmitted from the drive pulley to the spindle pulley with the result that a very high quality of work may be produced by the machine and the operation of the machine will be powerful but quiet.

If belts of the type whose ends are laced or otherwise connected are used in lieu of a continuous belt, vibrations will be set up each time the connected belt ends pass over the pulleys. Such vibrations make themselves apparent not only as markings in the finished product, but as audible nerve-racking sounds.

The construction illustrated in Figs. 5, 6 and 8, provides a main spindle in which power is applied as close to the nose or forward end thereof as is practicable and wherein the main spindle and pulley are solidly supported in their own bearings. Access to pulley 38 may be had around the rear end of overhanging wall 57 and through the top of the central compartment upon removal of cover member 53. As disclosed in Fig. 8, the structural details of the headstock and base are such as to provide free unobstructed access between drive pulley 49 and spindle pulley 38.

The forward end of the auxiliary spindle 60 is provided with clutch teeth which are complementary to and which are adapted to engage or mesh with clutch teeth 92 carried by the rear end of main spindle 59; it is likewise provided with a counterbored portion into which liner sleeve 93 fits. The liner sleeve forms an aligning sleeve for the forward end of auxiliary spindle 60 and also interconnects the adjacent ends of the holes 198 and 199, which extend longitudinally through spindles 59 and 60 respectively, for precluding entry of water, chips, or other substances into the central belt compartment through said holes. The auxiliary spindle is journaled in anti-friction bearings 97 and 98 which are secured to and housed within a sleeve 99 fixedly secured to end bracket 100. Sleeve 99 is slideably journaled to front wall 58 and rear wall 101 of the rear compartment 51. This construction permits auxiliary spindle 60 to be moved axially relative to the main spindle 59 to a forward position in contact or abutment with the adjacent end of the main spindle (Fig. 5), or to a retracted position spaced from the main spindle (Fig. 6). The complementary intermeshing clutch teeth of the main and auxiliary spindles will be engaged, when the auxiliary spindle is in a forward position, whereby a driving connection will be established between the main and auxiliary spindles. Sleeve 99 and its associated mechanisms may be releasably maintained in a forward position by means of bolts 102 by which the end bracket 100 is releasably secured to rear wall 101.

A spindle gear 103 and a pump gear 104 are keyed to the auxiliary spindle for rotation therewith. An oil pump 105 having a driven gear 106 which meshes with pump gear 104, may be suitably mounted within rear compartment 51 by means of bolts 107. Suitable oil distribution pipes indicated generally by the numeral 108 lead from pump 105 to various bearings and gears of the headstock. By thus driving pump 105 directly from the spindle it will be observed that the amount or quantity of lubricant delivered to the various bearings and gears will be proportional to the spindle speed, wherefore the rate at which lubricant is delivered to the various bearings and gears will always satisfy the lubrication requirements of the device.

With reference now to Fig. 6, it will be observed that when the end bracket clamping bolts 102 have been loosened, sleeve 99, auxiliary spindle 60 including its associated gears 103 and 104, may be pulled endwise, that is to the left, away from the central compartment and main spindle 59 for providing a clearance space between adjacent walls 57 and 58 of the central and rear compartments, thereby affording free access to spindle pulley 38, see Fig. 8. This construction permits the spindle pulley to be fully enclosed within the central compartment 50 of the headstock at a location intermediate the overall length of spindles 59 and 60, and yet be easily accessible over the rear end of the main spindle for removing and/or replacing belts thereon. It will likewise be observed that access to the spindle pulley may be had without disturbing or in any way affecting the mounting or alignment of the main spindle bearings or of the spindle in its bearings. The endless drive belts may be changed without disturbing or partially dismantling the main spindle assembly as has heretofore been necessary in those of the prior art devices wherein power was applied to the intermediate portion of a spindle assembly.

Spindle gear 103 is adapted to engage intermediate drive gear 109 of the feed drive housed within lower portion 110 of rear compartment 51. The feed drive is adapted to drive the feed rod 29 and lead screw 37 which are adapted to impart a longitudinal travel to carriage 33 by means of suitable mechanisms, not illustrated. Inasmuch as the gear train of the feed drive transmission does not comprise part of the present invention, it has not been illustrated in detail, it being understood that any conventional feed drive may be utilized, such as by way of example, is disclosed in my patent for speed changing mechanism No. 2,149,014, dated February 28, 1939.

It will be understood that the widths of spindle gear 103 and pump gear 104 are of a sufficient dimension to preclude disengagement from their respective intermeshing gears 109 and 106 incident to movement of the auxiliary spindle 60 from a forward to a retracted position. The retracted position of sleeve 99 will be determined by engagement of face 123 of the sleeve with forward face 124 of the intermediate gear 109, and by engagement of the rear face 125 of said gear with end or stop face 126 provided on wall 101. As has hereinabove been indicated, the total rearward movement of the sleeve is of an amount sufficient to provide a free, substantially unobstructed passageway or space between adjacent walls 57 and 58 of the central compartments for facilitating free passage of the drive belts therebetween. When in a forward position the auxiliary spindle spans the space between walls 57 and 58 and sleeve 99 projects forwardly from wall 58, into said space, as illustrated in Fig. 5.

The present device likewise embodies a simple, yet highly effective means for automatically and positively locking the feed drive relative to the spindle incident to indexing of the spindle. At the outset it should be noted that the composite spindle 36 will be indexed only during those periods of time when the main and auxiliary spindles of which it is composed are in the connected relationship disclosed in Fig. 5.

Figure 4:
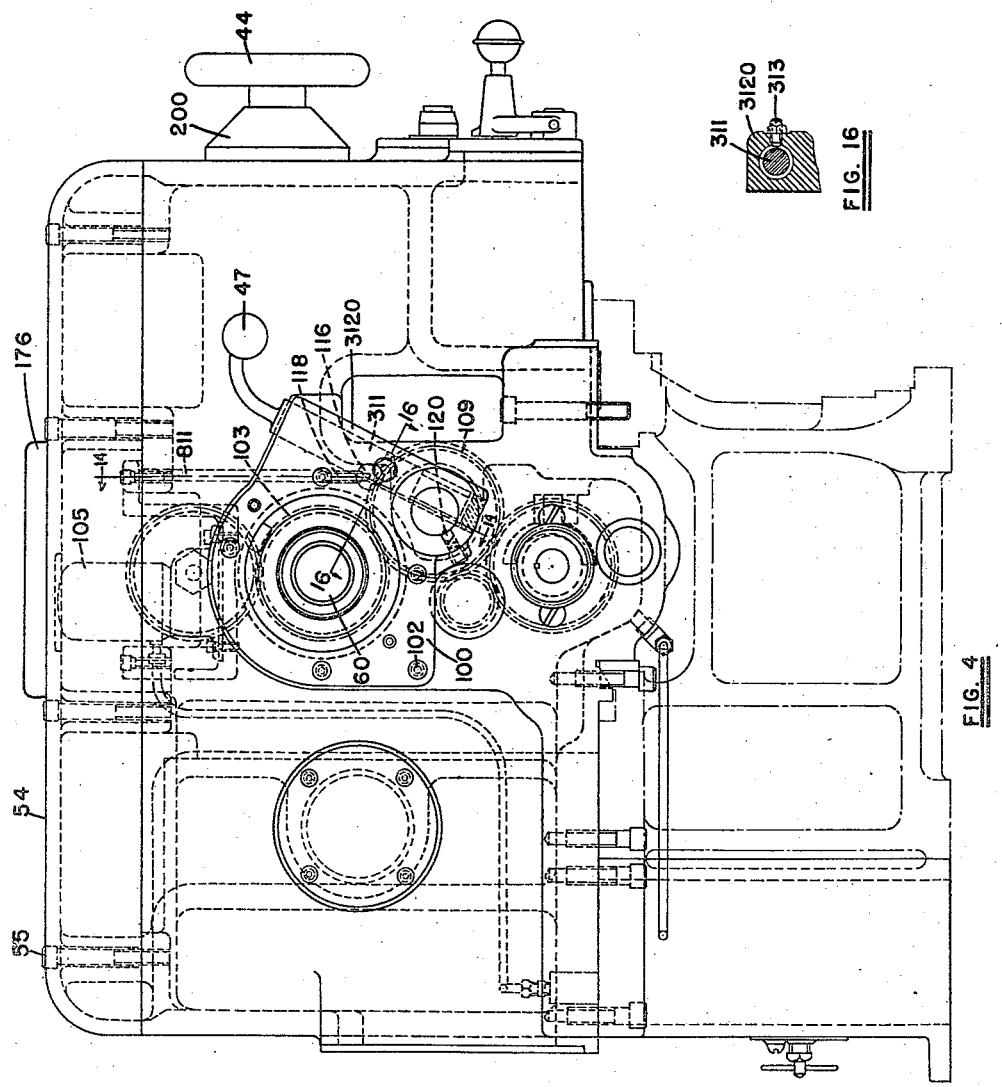
Fig. 4 is a rear end elevation of the headstock of Fig. 2.

As disclosed in Figs. 5 and 6, an index sleeve 111 may be secured to the outer end of the auxiliary spindle 60. Sleeve 111 may be provided with suitable indexing indicia around its outer periphery which may be observed by an operator through a slot or window 112 provided in end bracket 100. Incident to indexing purposes the spindle may be disconnected from a driving relationship with the feed drive by means of pinion 113 provided on the lower portion or end of shaft 311, the upper end of which terminates in the indexing lever 47 (Fig. 4). Shaft 311 may be rotatably journaled in housing 3120, formed as an integral part of end bracket 100. Withdrawal of said shaft from its housing may be effectively precluded by means of a set screw 313, Fig. 16.

Pinion 113 meshes with rack teeth 312 provided on the rear or outer end of an axially shiftable shaft 114 to which intermediate gear 109 is journaled on anti-friction bearings 115. Rotation of pinion 113 through indexing lever 47 imparts an axial movement to shaft 114 and its intermediate gear 109, to the right, that is, toward front wall 59 of the rear compartment to a position out of engagement with spindle gear 103 and into engagement with a fixed or non-rotatable intermediate-gear-engaging element of plug stop 116 (Fig. 14). This element of plug 116 is shown as a tooth 117 formed thereon which is adapted to mesh with any pair of teeth of intermediate gear 109. It may be carried by front wall 58 of the rear compartment and be secured thereto by means of a set screw 118 (Figs. 4 and 14), which threadably engages bore 811 provided in wall 58. Element 116 is so related to spindle gear 103 and intermediate gear 109 that it will be engaged by the teeth of the intermediate gear incident to and just before said gear has been completely disengaged from the spindle gear. In the preferred embodiment of the invention the end of tooth 117 of element 116 and the ends of the gear teeth of spindle gear 103 and intermediate gear 109 are rounded, as illustrated in Fig. 17 for facilitating meshing of said teeth. Such construction likewise precludes the intermediate gear from simultaneously engaging spindle gear 103 and element 116 during those periods of time when a rotative force is accidentally or unintentionally applied to the spindle while it is in the intermediate position of Fig. 6, thereby avoiding damage to the gears. By thus rounding the gear teeth, as illustrated, rotation of spindle gear 103 will cause intermediate gear 109 to be quickly shifted or kicked away from teeth 103, that is to the right, into full engagement with tooth 117.

By thus automatically and positively locking the feed drive against accidental or unintentional movement or rotation relative to the spindle incident to disengagement of the feed drive from the spindle, for indexing purposes, maximum accuracy and performance of the machine will be assured.

Shaft 114 is adapted to be normally located at one end or the other of its axial travel, for locating intermediate gear 109 in engagement with spindle gear 103, or in engagement with the element 116. A suitable stop face 119 may be provided on shaft 114 which will engage or abut pinion 113 for indicating full engagement of intermediate gear 109 with spindle gear 103. The shaft may be releasably held in an extended position for effecting engagement of the intermediate gear with element 116, by means of a spring actuated ball 120 which is adapted to releasably engage groove 121 provided in shaft 114 (Figs. 4, 5 and 6). The maximum amount by which the intermediate gear may be shifted toward wall 58 will be determined by engagement or abutment of face 124 of said gear with stop face 123 of sleeve 99. During those periods of time when the intermediate gear 109 has been disconnected from spindle gear 103 and is fully engaged with the element 116, the spindle may be rotated relative to the locked feed drive by means of a tommy pin, or the like inserted in holes 122 provided in the index sleeve 111. After the spindle has thus been indexed, the intermediate gear may be shifted into engagement with spindle gear 103 for reestablishing a driving connection between the feed drive and spindle.

As the intermediate gear is moved out of engagement with tooth 117 it will reengage spindle gear 103 just before leaving tooth 117 thereby assuring alignment of the intermediate gear with the having-been-indexed spindle gear.

In order to provide maximum operating efficiency, the present invention likewise embodies spindle driven means for continuously indicating the peripheral or cut-speed of work rotated by the spindle. Heretofore the cut-speed of machine tools was computed by an operator from the R. P. M. of the spindle and the diameter of the work. Experience has proven that very few operators are capable of properly or accurately computing cut-speeds, with the result that the work is likely to be machined below the most economical speed, with the result that more time is spent on the operation than is necessary, or conversely, the work is likely to be machined too rapidly, with the result that damage to the tool edge will occur.

In order to overcome such difficulties so-called cut-meters or cut-speed-tachometers have been devised which may be manually held against a work piece by an operator. Such devices are subject to the disadvantage that they do not promote efficiency since they are seldom immediately available when needed. They are likewise limited in operation, and their careless use is apt to lead to, or at least be a contributing factor resulting in serious injury to the operator.

The cut-speed indicator 48 (Figs. 1, 9, 10 and 11) is adapted to be mounted on the top of the headstock over forward compartment 49. With particular reference now to Fig. 10, it will be observed that this device comprises a beveled friction wheel 127 keyed to short shaft 128 which is journaled in anti-friction bearings 129 in the lower end of sleeve 135 which is housed within hub 130. Friction wheel 127 is adapted to frictionally engage the planar annular track on face 131 of spindle drive gear 68 which is keyed to the main spindle for rotation therewith. Friction wheel 127 is yieldingly maintained in contact with face 131 of gear 68 by means of spring 132 and is maintained in a constant drive ratio with the gear and spindle. Short shaft 128 is connected to short shaft 133 journaled in anti-friction bearings 134 in the upper end of sleeve 135 by means of a connector element 136 which may comprise a length of tube or the like to which short shafts 128 and 133 are splined. A disc 137 including hub 731 is carried by the upper end of shaft 133 and secured thereto by means of taper pin 732. The upper face 733 of disc 137 is adapted to be engaged by a friction drive wheel 138 which is carried on and mounted for slidable movement along square shaft 139 to which it is journaled by means of the bearing assembly 140 carried by nut carrier 141 which threadably engages drive screw 142. Shaft 139 is disposed in spaced parallelism with the upper face of disc 137, and extends diametrically thereof. Disc 137 is yieldingly urged upwardly toward friction wheel 138 by means of spring 734 interposed between ledge 735 of hub 130 and the lower face of ledge 736 of sleeve 135, as illustrated. Square shaft 139 may be connected by means of gears 143 and 144 to stub shaft 145 which is journaled in anti-friction bearings 146. Stub shaft 145 may be fixedly connected by means of a clutch 147 to the drive shaft 148 of a tachometer denoted generally by the numeral 149. If desired, the tachometer may be of the magnetic type including a dial 150 (Fig. 12) and a pointer 151 movable relative to said dial for indicating the peripheral speed directly in feet per minute of work rotated by spindle 36. Pointer 151 is secured to and carried by tachometer shaft 737.

In order to correlate the tachometer drive to the diameter of the work, the peripheral speed of which is being indicated, means are provided for adjusting the drive ratio or connection between frictional drive wheel 138 and disc 137 in accordance with the diameter of the work. Such means may include a calibrated work diameter dial 152 (Fig. 13) which for work pieces having diameters up to 12" may be graduated from 0" to 12", like a machinist's scale. Dial 152 may be keyed to one end of a shaft 154 (Fig. 11) rotatably mounted in housing 155 and to the other end of which shaft is keyed a gear 156 which meshes with gear 157 which may be integral with a shaft 158 rotatably mounted in laterally spaced bearing blocks 159. A spiral gear 160 keyed to shaft 158 meshes with spiral gear 161 keyed to shaft 162 rotatably mounted in bearing blocks 163 and 164 (Fig. 10). A gear 165 keyed to the end of shaft 162 meshes with gear 166 which is secured, by means of pin 167 to one end of drive screw 142. The herein described gear train between diameter dial 152 and drive screw 142 is so designed whereby one revolution of said dial will traverse nut carrier 141 along drive screw 142 by an amount sufficient to shift friction wheel 138 between the limits of its travel relative to disc 137.

In those instances where the maximum diameter of work rotated by the spindle is 12" in diameter, the diameter of disc 137 may, by way of example, be 6", wherefore the maximum overall travel of the friction wheel would be one-half of this diameter, or 3". When friction wheel 138 is positioned as illustrated in Fig. 10, that is, engaging the outer or maximum diameter of disc 137, the tachometer will register directly the peripheral speed in feed per minute of a work piece 12" in diameter revolving at the speed of the spindle. As diameter dial 152 is turned from a 12" setting to a lower diameter setting, according to the calibrations inscribed thereon (Fig. 13), friction wheel 138 will be shifted inwardly toward the center of disc 137 for indicating the various peripheral speeds of work pieces rotated by spindle 59 having diameters less than 12". When the diameter dial is set for a zero reading, friction wheel 138 will be disposed over the center of rotation of disc 137 with the result that no driving torque will be transmitted from the disc to the friction wheel and pointer 151 of the tachometer dial will indicate a zero peripheral speed.

Figure 9:
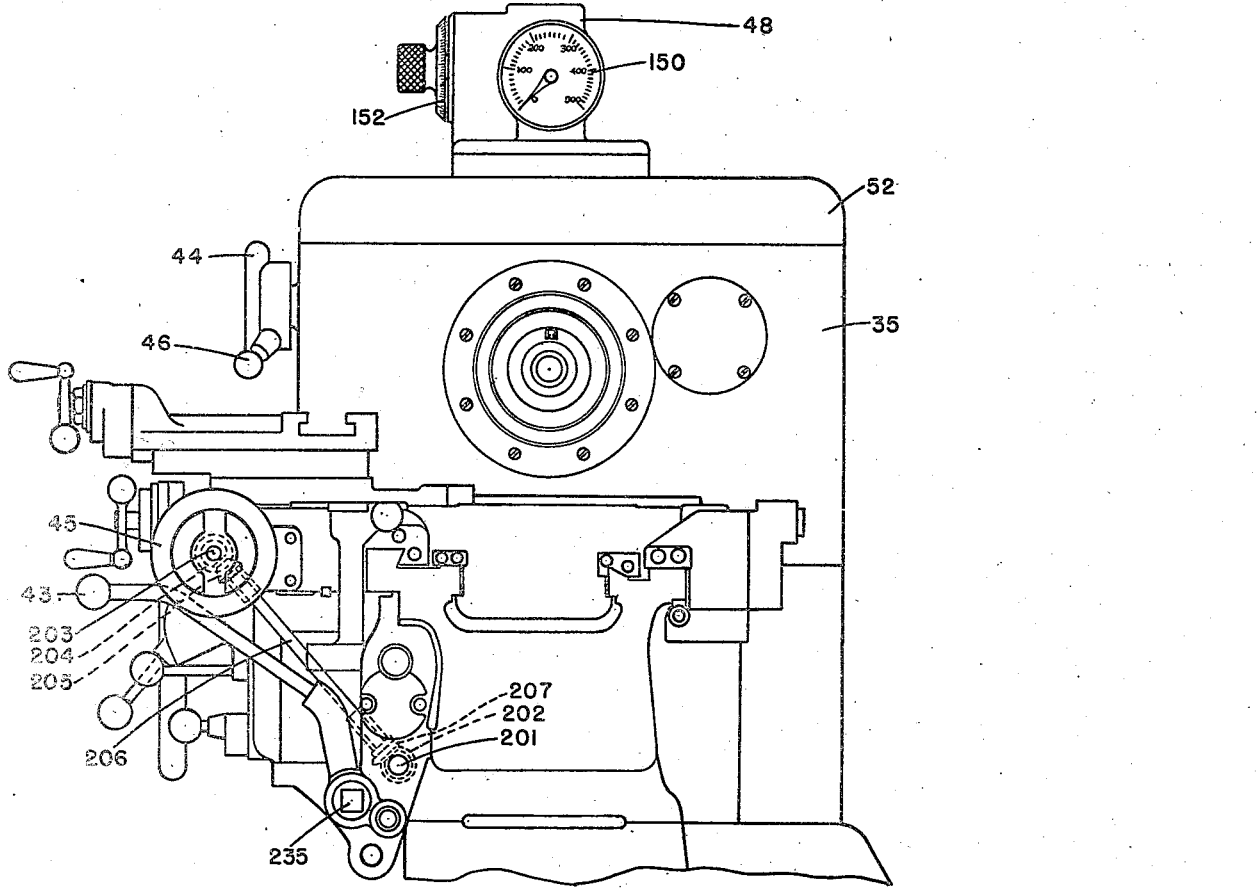
Fig. 9 is a tail end elevation of Fig. 1 with the lower part broken away.

The cut-speed indicator has been illustrated in Figs. 1 and 9 as being mounted to the headstock with the dial portion facing the tailstock end of the bed, however, it should be understood that the dial may be located so as to be readable from the front of the headstock or at any intermediate angle merely by turning the base of the cut-speed indicator to the desired location.

As disclosed in Figs. 2, 3 and 10 the back gear shifter lever 71 is made arcuate in form and is provided with a central annular collar 174, as has been already explained, for facilitating insertion of friction drive wheel 127 of the cut-speed indicator to a position in engagement with face 131 of spindle gear 68.

The mechanism of the cut-speed indicator may be housed within a two-piece casing comprising an upper portion 300 and a lower or base portion 179 secured thereto by means of bolts 302 (Fig. 11). Base portion 179 is adapted to be seated in recess 178 of the front compartment cover upon removal of cover plate 176 (Fig. 3), and secured in place by means of bolts 303 which engage the same bolt holes as the cover plate bolts 177.

Hub 130 (Fig. 10) is adapted to extend downwardly into aperture 175 of bushing 171 for disposing friction drive wheel 127 in driven engagement with face 131 of spindle gear 68. It will be observed that the pivotal mounting of the back gear shifter lever 71 does not interfere with hub 130 nor driven wheel 127.

In operation, an operator will set the work diameter dial 152 to correspond with the diameter of the work to be machined for effecting a driving ratio or connection to the tachometer which will indicate the true peripheral speed of the work. The operator knows, or is given, the most efficient cut-speed for the particular type of tool used and kind of work being machined, wherefore he has only to adjust the spindle speed until the desired or predetermined cut-speed is indicated on dial 150 of the cut-speed indicator for the particular work diameter set on dial 152. In those instances where the work includes different diameters which are to be successively machined, the operator will successively adjust work diameter dial 152 to the various diameters as they are reached and then readjust the spindle speed until the proper cut-speed reading is again indicated on dial 150. It will be observed that by mounting the tachometer to the headstock as indicated in Figs. 1 and 10, the dial thereof is always accessible for observation, not only to the operator of the machine, at the headstock and at stations remote therefrom, but also to supervisors who may readily ascertain whether an operator is utilizing his machine properly and at its maximum efficiency.

In the preferred embodiment of the invention, the operating characteristics of prime mover 39 are controlled by suitable means such as, by way of example, a rheostat 270 (Fig. 8) which may be mounted to the outer wall 500 of central compartment 50. Control of the rheostat may be effected by means of handwheel or speed control dials 44 and 45 which may include an index disc 200 on which the various spindle speeds may be calibrated. In order that the spindle speed may be controlled by an operator from a position along the bed, as well as from the headstock, means are provided for enabling the rheostat to be remotely controlled from the apron. Such means may comprise a remote control shaft 201 (Figs. 1, 8 and 9) which extends along and is suitably journaled to bed 31. This shaft is preferably splined and is slideably engaged by beveled sleeve gear 202 (Figs. 1 and 9). Handwheel 45 is operably connected in driving relationship with bevel gear 202 through shaft 203 to which is secured a bevel gear 204. A bevel gear 205 secured to the upper end of shaft 206 meshes with bevel gear 204, and bevel gear 207 secured to and carried by the lower end of shaft 206 engages bevel gear 202. It will be understood that shafts 203 and 206 are suitably journaled for rotation relative to the apron for establishing an operative drive connection between handwheel 45 and shaft 201. A bevel gear 208 is secured to the rearmost end of control shaft 201, and is in driving relationship with bevel gear 209 secured to the lower end of shaft 210 rotatably mounted in bearing bosses or projections 211 and 212 comprising part of wall 213. The upper end of shaft 210 terminates in bevel gear 214 which meshes with bevel gear 215 secured to one end of a shaft 216, the other end of which is provided with a bevel gear 217 which in turn meshes with a bevel gear 218 secured to a shaft 219 to which sprocket wheel 220 is keyed. Sprocket wheel 220 is connected to sprocket wheel 221 keyed to the rear end of control shaft 222 of the rheostat by means of chain 223. It will be observed that this drive connection synchronizes the action and setting of control wheels 44 and 45 for enabling an operator to selectively adjust and control, through an infinitely variable speed range, the operating characteristics of the prime mover from either the headstock or the apron. The indicated control means for prime mover 39 enables the operating characteristics of the prime mover to be varied in accordance with the peripheral speed requirements of the work rotated by the spindle, as indicated on dial 150 of the cut speed indicator.

The prime mover may be stopped and/or started from the headstock or from a location at the headstock or along the apron by means of levers 42 and 43. As disclosed in Figs. 1, 7 and 8, lever 42 is connected by means of suitable linkage members 230, 231, 232, 233 to toggle switch 234 through which electrical connections to the motor are made, it being understood that the motor may be rapidly and effectively brought to a sudden stop incident to opening of toggle switch 234 by means of dynamic braking. Lever 43 is adapted to remotely control said toggle switch by means of control shaft 235 which extends along and is suitably journaled to the bed of the machine. Linkage member 230 engages shaft 235 whereby to be actuated thereby. The lever 43 is adapted to make sliding connection with shaft 235 as the apron is moved along the bed whereby the prime mover may be stopped or started from the apron, regardless of its distance from the headstock.

Figure 7:
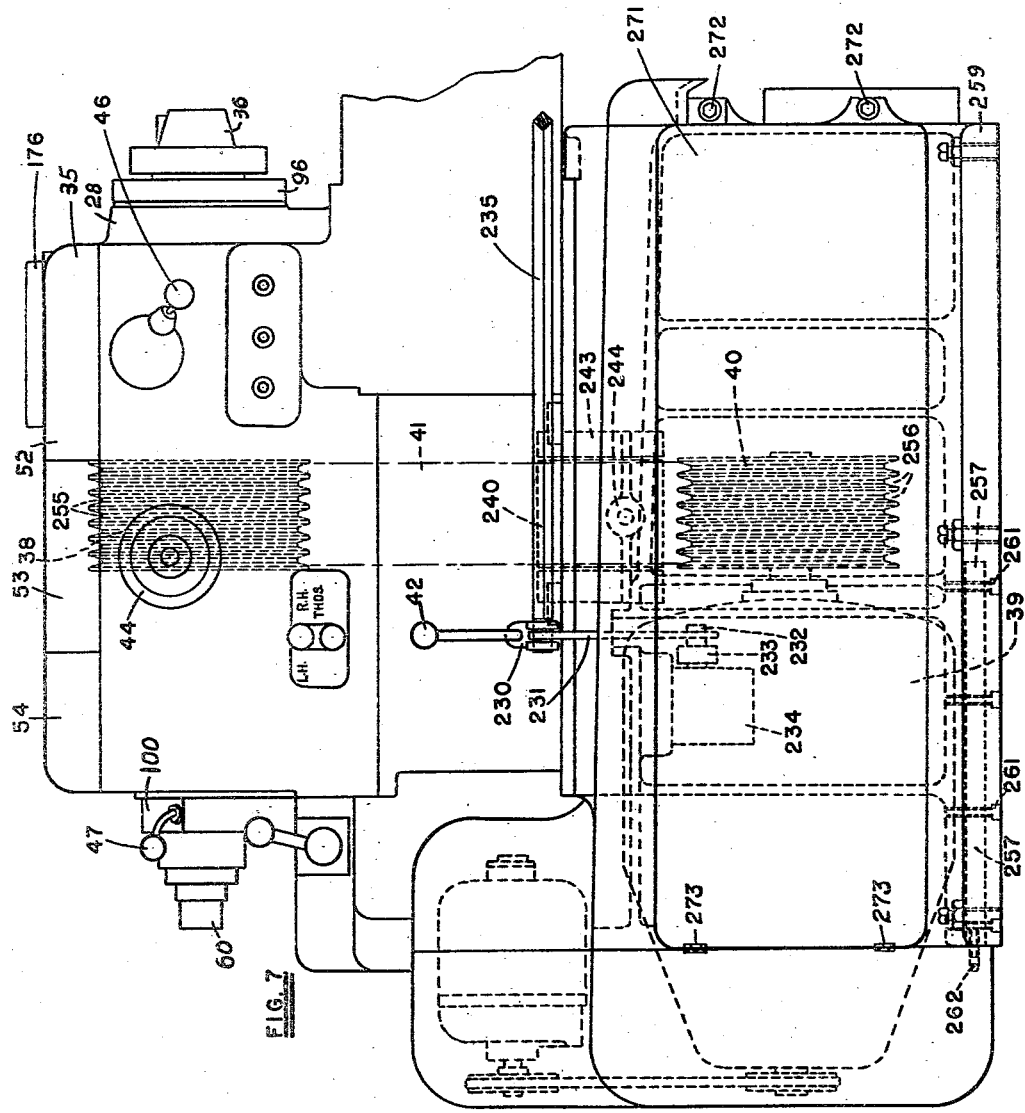
Fig. 7 is an enlarged front elevation of the headstock and motor drive mechanism of Fig. 1 with the cut-speed indicator omitted.

With reference now to Figs. 7 and 8, it will be observed that an idler pulley 240 is provided for adjustably controlling the tension of drive belts 41. Idler pulley 240 (Fig. 15) may be mounted on anti-friction bearings 241 for rotation about shaft 242, the ends of which are carried by and secured to a pair of spaced side plates 243. These plates may be integrally connected along their rear edges to a rearwardly projecting internally threaded hub 244. The upper portion of plates 243 are grooved as at 245 for slidably engaging the overhanging edge of tracks 246 carried by and secured, as by bolts 247, to cross member 248 of the prime mover housing. Plates 243 and the idler pulley assembly are shiftable along the tracks incident to manipulation of screw 249 which threadably engages hub 244 and boss 250 formed in wall 251. A collar 27 is provided on the outer end of the screw, as illustrated. The outer or free end of screw 249 may be provided with a square end 351 which may be engaged by a wrench, handwheel, or other suitable device for imparting a turning movement to the screw for shifting pulley 240 toward or away from the belts.

In the preferred embodiment of the invention, drive belts 41 are of the so-called V-type having a flat outer face 252 and a pair of side faces 253 which converge to a narrow inner face 254. The converging side faces 253 are adapted to frictionally engage complementary grooves 255 and 256 provided in spindle pulley 38 and drive pulley 40, whereas the outer face of adjustment pulley 240 is adapted to engage the flat outer face 252 of the drive belts for controlling the tension of said belts.

In order to facilitate removal and replacement of the drive belts, prime mover 39 is preferably mounted for movement along the axis of rotation of drive pulley 40 in order that the grooves 256 of the drive pulley may be successively disposed beneath and in axial alignment with the various grooves 255 of the axially fixed spindle pulley. To this end, prime mover 39 may be carried by and secured to motor plate 257 the side edges of which are engaged by overhanging lips 258 formed in base block 259. In the preferred embodiment of the invention, a tie plate 260 is provided beneath motor plate 257 having its opposite ends secured, as by bolts 261, to base block 259 for providing a rugged structure. Movement of the motor plate may be effected, by way of example, by means of a pinch bar introduced through eyelet 262 secured in the end of the plate. The plate may be locked in place by means of a screw or other latching device, not illustrated.

With reference now to Fig. 7 it will be observed that if motor plate 257 be shifted rearwardly, that is, to the left, drive pulley 40 will be moved out of vertical alignment with spindle pulley 38. In order to replace drive belts, cover 63 of the central compartment 50 is first removed, after which the belts may be hung from their respective grooves 255 of the spindle pulley, after which the motor plate may be shifted forwardly, to the right, for the purpose of successively aligning grooves 256 of drive pulley 40 with the various belts as they are moved from groove to groove, until each belt has been properly aligned with its respective grooves in the spindle and drive pulleys. After the drive belts have been mounted, idler pulley 240 may be adjusted, by screw 249, for imparting the desired tension to the belts. It will be understood that in order to remove the drive belts the mounting procedure is reversed, that is, idler pulley is slacked off and the drive belts are moved outwardly, from groove to groove of the drive pulley as the motor plate is moved to the left. This construction makes it possible to use belts of the same length, none of which are stretched more than any of the others incident to removal and replacement. From the foregoing it will be noted that the relationship between the spindle pulley 38, drive pulley 40 and idler puller 240 is such as to provide an adjustable, yet rugged, drive connection between the prime mover and spindle.

The wiring connections to the various electrical controls and motors may be housed upon a terminal board, denoted generally by the numeral 470 in Fig. 8. Access to said board, to prime mover 39, to pulley 40, and to the entire interior of the base may be had by way of panel 271, hingedly secured as at 273 to the base. The other end of the panel may be secured to the base by means of lock bolts 272.

It should be understood that the present invention is not concerned with nor directed to any particular type of prime mover. If desired it may comprise a motor generator set, a hydraulic drive, or the like, so long as selective control of its operating characteristics may be had. Such control feature is of prime importance in those instances where the spindle is connected for direct or in open belt drive. In the event that a hydraulic drive be utilized rheostat 270 would be replaced by a suitable valve for providing infinitely variable speed control of the prime mover.

It will be understood that the overhanging construction of the central compartment, as clearly disclosed in Figs. 5 and 6, results in the spaced relationship between walls 57 and 58 for providing access to spindle pulley 38 between said walls and over the rear end of main spindle 59, without disturbing or in any way affecting the mounting and/or alignment of the main spindle bearings or of said spindle in said bearings. This is in sharp contrast to the procedure formerly followed in those machine tools wherein the power was applied to the intermediate portion of a spindle assembly, but wherein complete dismantling of the spindle assembly was necessary in order to replace the belt drive. The instant spindle mounting and the relationship between the various mechanisms driven by the spindle provide a machine tool characterized by its accuracy, utility, ruggedness and ease of maintainability.

From the foregoing it will be observed that the rotative forces may be applied to the main spindle at a location as close to its nose as is practically possible commensurate with the provision of back gearing, thereby effectively lessening the distorting effect of torsional stresses induced in the spindle. By providing an auxiliary spindle to the rear of and in axial alignment with the main or work engaging spindle, power may be directly applied to the feed drive without having to resort to a complicated gear train operated from the forward portion of the main spindle. The auxiliary spindle is positively driven by the main spindle except during those periods of time when it is withdrawn to the retracted position illustrated in Fig. 6 for facilitating renewal of the endless drive belts. During those periods of time when the two spindles are interconnected (Fig. 5) they rotate and function as a single spindle having a length equal to the sum of the lengths of the individual spindles 59 and 60.

In regard to the use of any conventional feed drive, for example as exemplified in my said Patent 2,149,014, it is to be understood that the intermediate gear 109, driven from gear 103 on the auxiliary spindle 60, serves herein merely as the take off or connecting link between gear 103 and gear 236 in the same fashion that gear 242 in my said Patent 2,149,014, serves as a take off or connecting link between the spindle gear 241 and the gear 243 of the power transmission elements connected with or forming part of the feed mechanism of that patent.

In regard to the use of back gear transmission, it is not intended by the reference herein, to my Patent 2,149,013, to imply that the instant application discloses the back gear arrangement of said patent. In the instant application the intention is to indicate merely that any suitable, commonly used or special type back gearing and shifting means may be employed for transmission of variable speeds between the drive member 38 and the spindle element 59, and which will not require any change or departure from the objectives of the instant application.

Referring to Fig. 5, the intermediate gear 109 is held in position on shaft 114 by the bearing member 1090 which is threaded upon the end of shaft 114 and abuts the end of the one ball race of bearing 115. The member 1090 is adapted to slide in its seat or bearing in the wall 58.

Referring to the sleeve 99, same is in the form of an elongated hollow annular cylinder, comparable to a section of a large pipe, with suitable slots or openings cut or formed therein to permit various parts to project through the sleeve.

What is claimed is:

1. In a device of the class described, a headstock assembly, comprising in combination a two-piece spindle including a main and an auxiliary spindle, a spindle drive pulley, means for independently mounting said spindles in an end to end relationship for rotation about a common axis, means for mounting said spindle drive pulley independently of and for rotation relative to said main spindle, means operable for connecting said pulley in driving relationship with said main spindle, means operable for connecting said auxiliary spindle in driven relationship with said main spindle, and means for mounting said auxiliary spindle for axial movement relative to said main spindle to a position in engagement therewith, or to a position spaced therefrom for providing access to said drive pulley from a location between said spindles.

2. In a device of the class described, a headstock assembly, comprising in combination, a two-piece spindle including a main spindle having a forward work engaging end and a rear end, and an auxiliary spindle having forward and rear ends, a sleeve disposed in spaced relationship with and circumscribing the rear portion of said main spindle, a drive pulley secured to and carried by said sleeve, means for independently mounting each of said spindles in an end to end relationship with the rear end of the main spindle adjacent the forward end of the auxiliary spindle for rotation about a common axis, means for mounting said sleeve independently of and for rotation relative to and about said main spindle, gearing carried by and secured to said main spindle adjacent its forward end, means operative for connecting said pulley in driving relationship with said gearing, means operable for connecting said main spindle in driving relationship with said auxiliary spindle, and means for mounting said auxiliary spindle for axial movement relative to said main spindle to a position in engagement therewith, or to a position spaced therefrom for providing access to said pulley over the rear end of said main spindle.

3. In a device of the class described, a headstock assembly comprising in combination, a two-piece spindle including a main spindle and an auxiliary spindle each having forward and rear ends, means for mounting said main spindle against endwise axial movement, means for mounting said auxiliary spindle in axial alignment with said main spindle and slidable axially thereof, a sleeve spaced from and circumscribing the rear portion of the main spindle, means for mounting said sleeve independently of and for rotation independently of said main spindle, a drive pulley secured to and carried by said sleeve, a spindle gear secured to and carried by the forward portion of said main spindle, means operative for connecting said pulley in driving relationship with said spindle gear, a feed drive gear secured to and carried by said auxiliary spindle in one or the other of two normal positions, in a forward position with its forward end in contact with the rear end of said main spindle, or in a retracted position with its forward end spaced from the rear end of said main spindle for providing free access to said pulley between the adjacent ends of said spindles without disturbing or in any way affecting the mounting or alignment of said main spindle, said auxiliary spindle when in a forward position being in driven relationship with said main spindle.

4. In a device of the class described, a headstock assembly, comprising in combination, a housing including forward, central and rear compartments and wherein the central and rear compartments are spaced apart by a dimension sufficient to facilitate the passage of an endless spindle pulley drive belt therebetween, a main work engaging spindle extending through and mounted for rotation relative to said forward and central compartments, a spindle drive pulley disposed in, secured to and rotatably mounted relative to said central compartment, an auxiliary spindle disposed in axial alignment with said main spindle, said auxiliary spindle extending through and mounted for rotation relative to said rear compartment, a clutch interposed between adjacent ends of said spindles, means for mounting said auxiliary spindle to said rear compartment for axial movement relative to said main spindle, to a forward position in engagement therewith or to a retracted position spaced therefrom, said auxiliary spindle when in a forward position spanning the space between the central and rear compartments, said auxiliary spindle when in a retracted position withdrawn from said space for providing free access to said spindle drive pulley by way of the space between said central and rear compartments.

5. In a device of the class described, a headstock assembly, comprising in combination, a housing including forward, central and rear compartments, a main spindle extending through and rotatably mounted in said forward and central compartments, an auxiliary spindle extending through said rear compartment, means for rotatably mounting said auxiliary spindle to and axially shiftable of said rear compartment, each of said main and auxiliary spindles disposed in axial alignment, a sleeve circumscribing said main shaft, means for rotatably mounting said sleeve in said central compartment independently of and for rotation relative to said main shaft, a drive pulley secured to and carried by said sleeve, a back gear assembly disposed in said forward compartment, gearing located in the forward compartment secured to and carried by said main spindle, said gearing selectively engageable with said back gears or with said sleeve, means operable for connecting said back gearing in driving connection with said pulley, clutch means operable for connecting said auxiliary spindle in driven relationship with said main spindle, said rear and central compartments being spaced laterally apart by a dimension sufficient to facilitate passage of an endless drive belt therebetween, said auxiliary spindle adapted to be disposed in a forward position spanning the space between the central and rear compartments and in driven engagement with said main spindle, or to a retracted position withdrawn from said space for providing free access to said pulley by way of said space and over the end of said main spindle.

6. In a device of the class described, a headstock assembly comprising, in combination, a housing including forward, central and rear compartments each including laterally spaced front and rear walls, said forward and central compartments being set apart by a common wall and wherein the rear wall of the central compartment is integral with and comprises an overhanging projection of said common wall, a main spindle extending through said forward and central compartments and rotatably mounted to and between the front wall of the forward compartment and the rear wall of said central compartment, a sleeve circumscribing said main spindle, means for rotatably mounting said sleeve to and between the front and rear walls of said central compartment independently of and for rotation relative to said main spindle, a drive pulley located in said central compartment secured to and carried by said sleeve, means operable for connecting said pulley in driving relationship with said main spindle for imparting a driving torque to said spindle as close to its forward work engaging end as possible, a prime mover including a drive pulley, a plurality of endless drive belts extending between and interconnecting said spindle and drive pulleys, said overhanging rear wall of the central compartment providing a rugged bearing support for the rear ends of said main spindle and sleeve without obstructing access to the top of said spindle pulley for said drive belts, the rear wall of said central compartment laterally spaced from the forward wall of said rear compartment by a dimension sufficient to permit free passage of said endless drive belts therebetween incident to replacement on or removal from spindle pulley, an auxiliary spindle extending through said rear compartment, means for rotatably mounting said auxiliary spindle to and axially shiftable of the front and rear walls of said rear compartment, said auxiliary spindle adapted to be disposed in a forward position spanning the space between the adjacent walls of the central and rear compartments and in driven engagement with the rear end of said main spindle, or to a retracted position withdrawn from said space for providing free unobstructed access to said spindle pulley between the adjacent ends of said spindles and over the end of said main spindle and overhanging wall of the central compartment without disturbing the mounting or alignment of said main spindle or spindle pulley, a feed drive located in said rear compartment and means operable for connecting said feed drive in driven relationship with said auxiliary spindle.

7. In a device of the class described comprising in combination, a headstock assembly, a two-piece spindle comprising a main spindle mounted for rotation about but fixed against movement along its axis, and an auxiliary spindle mounted for rotation about and slidable along said axis, a grooved drive pulley disposed on said main spindle adjacent its rear end, said auxiliary spindle shiftable axially away from said main spindle for providing a space between the adjacent ends of said spindles, a prime mover including a grooved drive pulley, means for mounting said prime mover for movement relative to said headstock for positioning said pulley in vertical alignment or non-alignment with said spindle pulley, a plurality of individual endless drive belts extending between and interconnecting said spindle and prime mover pulleys, said belts being received in the respective grooves of said pulleys, said belts adapted to be disengaged from their respective grooves of the prime mover pulley incident to movement of said pulley to a position out of alignment with said spindle pulley, said belts adapted to be removed from said spindle pulley through the space established between the adjacent ends of said spindles, thereby facilitating renewal of said drive belts without disturbing the mounting or alignment of said main spindle or spindle pulley.

8. In a machine tool of the class described, a headstock assembly comprising a spindle severable intermediate its ends into a forward and a rear section, means for detachably coupling the spindle sections into a unitary spindle member, driving means for applying power to the forward end of the spindle, a spindle gear carried by the rear spindle section, a feed drive comprising a driven gear adapted to be driven from said spindle gear and means for electively fixing said driven gear against movement and comprising an intermediate gear adapted to transmit power from the spindle gear to the driven gear, means operable for selectively shifting said intermediate gear into and out of mesh with said spindle gear while in mesh with said driven gear, and means engageable by said intermediate gear incident to disengagement from the spindle gear for positively locking said gear against rotation and for precluding accidental or unintentional rotation thereof while disengaged from said spindle gear.

9. In a machine tool of the class described, a headstock assembly comprising in combination a revolubly mounted work engaging spindle including a spindle gear, means for power driving the spindle, a feed drive comprising a driven gear adapted to be actuated from the spindle gear, and means for electively fixing said driven gear against movement and comprising an intermediate gear adapted to transmit power from the spindle gear to the driven gear, means operable for selectively shifting said intermediate gear into and out of mesh with said spindle gear while in mesh with said driven gear, and means engageable by said intermediate gear incident to disengagement from the spindle gear for positively locking said gear against rotation and for precluding accidental or unintentional rotation thereof while disengaged from said spindle gear.

10. In a machine tool indexing mechanism the combination of a rotatable spindle including a spindle gear, power means for rotating the spindle, a feed drive transmission including a shiftable intermediate gear, movable to one position for effecting a driving connection from the spindle gear to the feed drive mechanism and movable to a second position for severing said driving connection and for locking the feed drive mechanism against feeding motion, and comprising a fixed gear engaging member spaced from and fixed relative to said spindle gear, means operable for shifting said intermediate gear to mesh with said spindle gear or with said member, the relationship between said spindle gear and member being such that said intermediate gear will mesh with and positively engage said member just before being disengaged from the spindle gear for precluding accidental or unintentional movement of said feed drive relative to the spindle incident to and after disengagement therefrom, said spindle being rotatively operable relative to said intermediate gear when disconnected therefrom.

11. In a machine tool indexing mechanism the combination of a rotatable spindle including a spindle gear, power means for rotating the spindle, a feed drive transmission including a shiftable intermediate gear, movable to one position for effecting a driving connection from the spindle gear to the feed drive mechanism and movable to a second position for severing said driving connection and for locking the feed drive mechanism against feeding motion, and comprising a fixed gear engaging member spaced from and fixed relative to said spindle gear, means operable for shifting said intermediate gear to mesh with said spindle gear or with said member, the relationship between said spindle gear and member being such that said intermediate gear will mesh with and positively engage said member just before being disengaged from the spindle gear for precluding accidental or unintentional movement of said feed drive relative to the spindle incident to and after disengagement therefrom, said spindle being rotatively operable relative to said intermediate gear when disconnected therefrom, said gear structure and relationship being such that the intermediate gear may simultaneously contact the spindle gear and the fixed gear engaging member and while in such contact, any power movement of the intermediate gear will actuate the intermediate gear toward the fixed gear engaging member for rendering said member operative on the intermediate gear and simultaneously separating the intermediate gear from the spindle gear.

12. In a device of the class described, a headstock assembly comprising in combination, a two-piece spindle, including endwise separable main and auxiliary spindle sections disposed in alignment axially of one another, a unitary headstock providing multiple bearings for supporting said spindle sections in alignment and adapted to permit endwise movement of one of said spindle sections in relation to the other thereof, without affecting the alignment of said spindle sections, and a spindle drive pulley, means for independently mounting said spindle sections and pulley in the headstock and for rotation about a common axis, means operable for connecting said pulley in driving relationship with said main spindle, and other means operative for connecting said main spindle in driving relationship with said auxiliary spindle.

13. In a device of the class described, a headstock assembly, comprising in combination a plurality of spaced axially aligned journaled bearings carried by the headstock, a spindle including separable main and auxiliary sections having end to end aligned relation and journaled in certain of said aligned journal bearings, said auxiliary spindle section being movable endwise and axially into and from driving engagement with said main spindle section, whereby the spindle sections when coupled extend in continuity and rotate as a unit about a common extended axis, a spindle drive pulley coaxial with the spindle axis and supported by other of said spaced journal bearings and adapted for rotation about said common axis, means operative for connecting said pulley in driving relationship with said main spindle, and other means for maintaining said auxiliary spindle section in driving engagement with said main spindle section.

FRANK A. FRITZSCH.